May 14, 1963 C. C. WAUGH ET AL 3,089,336
MASS FLOW METER
Filed June 3, 1959 2 Sheets-Sheet 1

INVENTORS.
CHARLES C. WAUGH
KENNETH R. JACKSON
SPENCER D. HOWE
BY
P. E. Jeanque
ATTORNEY.

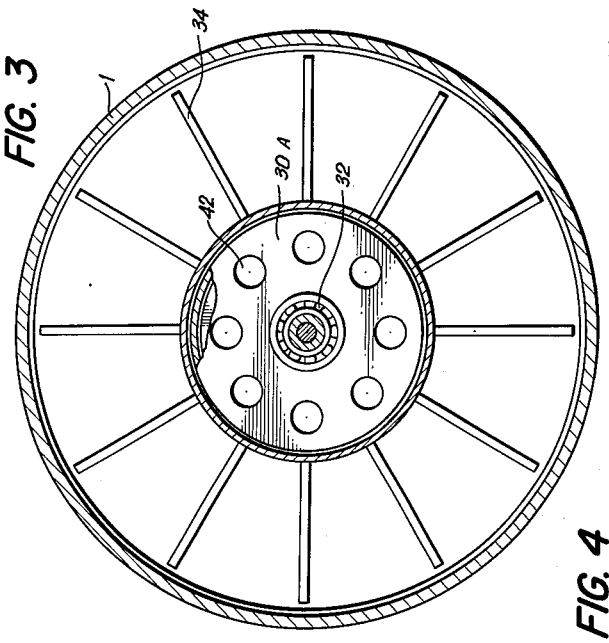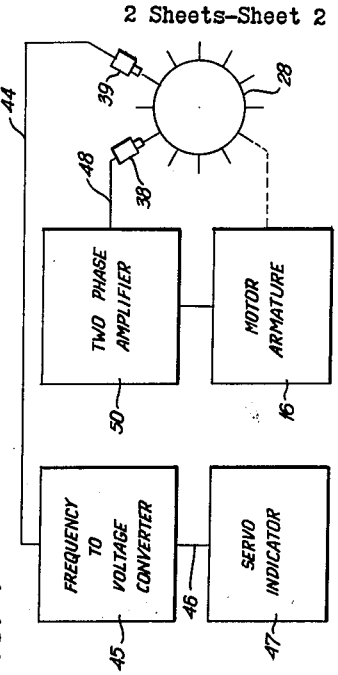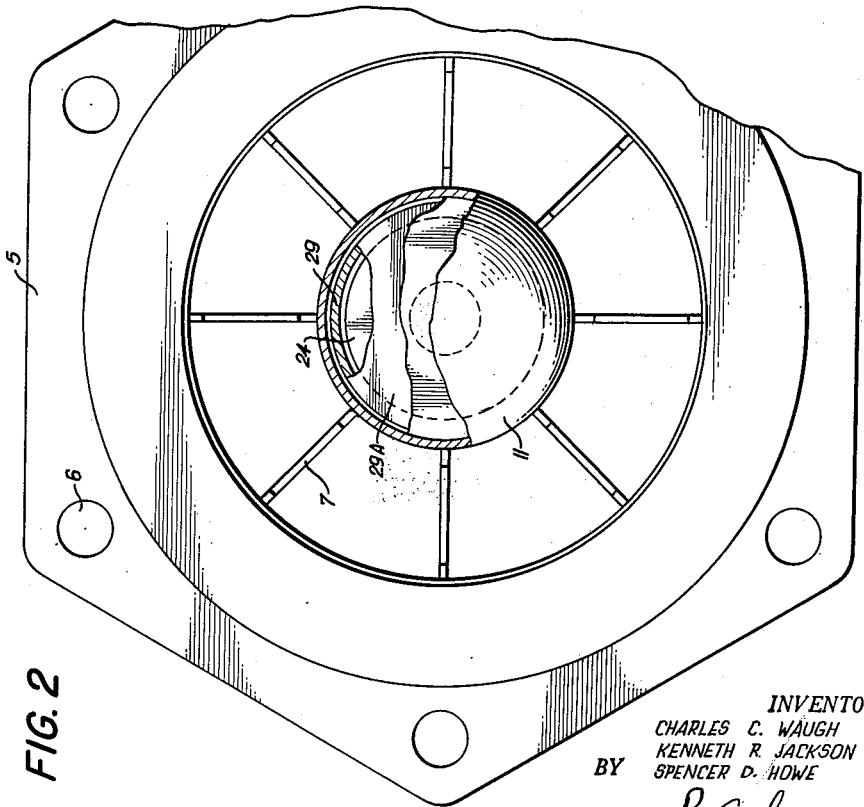

United States Patent Office 3,089,336
Patented May 14, 1963

3,089,336
MASS FLOW METER
Charles C. Waugh, Tarzana, and Kenneth R. Jackson and Spencer D. Howe, Los Angeles, Calif., assignors, by mesne assignments, to The Foxboro Company, a corporation of Massachusetts
Filed June 3, 1959, Ser. No. 817,794
10 Claims. (Cl. 73—194)

The present invention relates to fluid flow measuring apparatus and, more particularly, to improved apparatus for the measurement of fluid flow in units of mass rate of flow.

The weight rate of transfer of fluid in certain fluid flow circuits is frequently a characteristic of much greater significance than simple volumetric flow. For example, the heat content of the fuel consumed by an aircraft engine is directly related to the mass of the fuel. Expected flight duration and fuel loading of the aircraft are also related to the weight of the fuel, while volumetric data concerning the same fuel must be corrected or compensated for specific gravity to provide similar information because of wide fluctuations of the fuel volume with temperature. Also, in chemical industries, the gravimetric flows of fluid entering into reactions are generally critical, and distributors of fluids as well as their customers are commonly more concerned with their weight or mass than their volume alone.

One of the currently used methods of mass flow measurement utilizes the rate change of fluid angular momentum to generate a torque proportional of mass flow. In the application of this principle, rotating motion is imparted to the fluid by means of a motor-driven turbine. The fluid torque (T), the fluid angular velocity ($\omega$), and the mass flow rate are related by the expression $$Q = \frac{T}{\omega}$$

In practical embodiments of this concept, a constant angular velocity ($\omega$) is imparted to the fluid through the use of a turbine impeller driven by a constant-speed motor. The torque is then measured by means of a resiliently restrained reaction turbine downstream of the driven turbine which indicates the force required to reduce the fluid angular rotation to zero.

A disadvantage of prior flowmeters employing measurement of rate of change of angular momentum is that unless the driving turbine's speed is maintained uniform with great precision, the deflections of the reaction turbine will not be properly related to the mass flow and, hence, the measurement will be erroneous. Accordingly, it has been highly desirable to utilize electrical power supplies which have closely controlled output frequencies for the excitation of synchronous constant-speed motors used as the motive means for the driving turbine. It is of obvious advantage to eliminate the need for these complicated and costly regulated-frequency power supplies. Furthermore, these units may add weight and space complications in aircraft flowmeter installations.

By the present invention, these problems are avoided by driving the fluid at a constant torque, in which case the mass flow rate will be proportional to $$\frac{1}{\omega}$$

In the present invention, a single turbine is driven at a constant torque by means of a hysteresis drive. The speed of the turbine will then be inversely proportional to mass flow rate. A servo indicator which responds to the inverse of rotor speed may be used to indicate mass flow directly.

In any mass flowmeter requiring rotational motion of the fluid there will be a tendency for errors to be introduced due to the viscosity of the metered fluid. In prior art configurations employing two turbine elements a viscosity error is introduced through coupling between the restrained turbine and the rotating turbine. In the present invention employing a single turbine configuration, a similar effect arises due to coupling between the turbine and the stationary walls of the flow conduit. The magnitude of this viscosity effect may be large in the case of measuring certain fluids at low temperatures. Therefore, embodiments of the present invention may include a compensating feature employing viscous coupling in addition to the hysteresis drive between the driving element and the driven turbine which will reduce the effect of the metered fluid's viscosity to a negligible amount.

In the present invention a single turbine is employed, which is driven by a constant-torque drive; therefore, the turbine speed will be inversely proportional to mass flow rate. An electrical pick-off, responsive to rotation of the turbine rotor, is used to generate a signal which is proportional to the turbine's speed and inversely proportional to mass flow rate. An indicator which produces a deflection inversely proportional to this electrical signal will indicate mass flow rate directly.

A convenient means for generating the required electrical signal is to place a pick-up coil in close proximity to the path of a moving magnetic element carried on the rotor which will cyclically induce a pulse in the pick-up coil, the frequency of which is precisely proportional to the rotor speed. The frequency of the signal thus generated may then be coverted to a proportional D.C. voltage and displayed by means of a servo-type indicator. The D.C. output voltage from the converter is compared with an internal reference voltage to provide an indication which is proportional to the ratio of the two voltages. In more conventional applications of such servo indicators, the servo loop is arranged so that the deflection is directly proportional to the input voltage. In the case of the present invention, the internal arrangement may be reversed in order to produce a deflection proportional to the inverse of the converter output voltage.

As stated earlier, it is required that a constant torque be applied to the turbine rotor. This may be accomplished by means of a hysteresis drive comprising one or more rotating permanent magnets which exert a constant drag torque on the rotor. The torque thus imparted to the turbine rotor is independent of rotational speed of the permanent magnets and is very nearly independent of temperature. Slight changes in temperature may be compensated by means of a temperature sensitive disc which varies an air gap shunting the poles of each permanent magnet. A hysteresis drive of this type is exceptionally rugged, entirely immune from the effects of vibration, and does not require a constant-speed drive.

It is therefore an object of this invention to provide an improved flowmeter for accurately measuring mass rate of flow by imparting to the fluid a constant angular torque.

Another object of this invention is to provide an improved turbine-type flowmeter for measuring mass rate of flow which employs only a single turbine rotor in the flow circuit, the speed of which is inversely proportional to mass flow.

Still another object of this invention is to provide a mass flowmeter which is relatively unaffected by changes in viscosity of the fluid to be measured.

It is a further object of this invention to provide novel and improved mass flow measuring apparatus in which frequency regulated power sources are unnecessary.

These and other objects of the invention not specifically set forth above will be readily apparent from the accompanying description and drawings in which:

FIGURE 2 is an end elevational view, partly in section showing the vanes which serve to straighten the flow as well as to support the internal elements.

FIGURE 3 is a transverse section along line 3—3 of FIGURE 1 showing the turbine rotor vanes and driving motor.

FIGURE 4 is a schematic diagram illustrating the relationship of the various electronic elements useful in the application of this invention.

Figure 1:
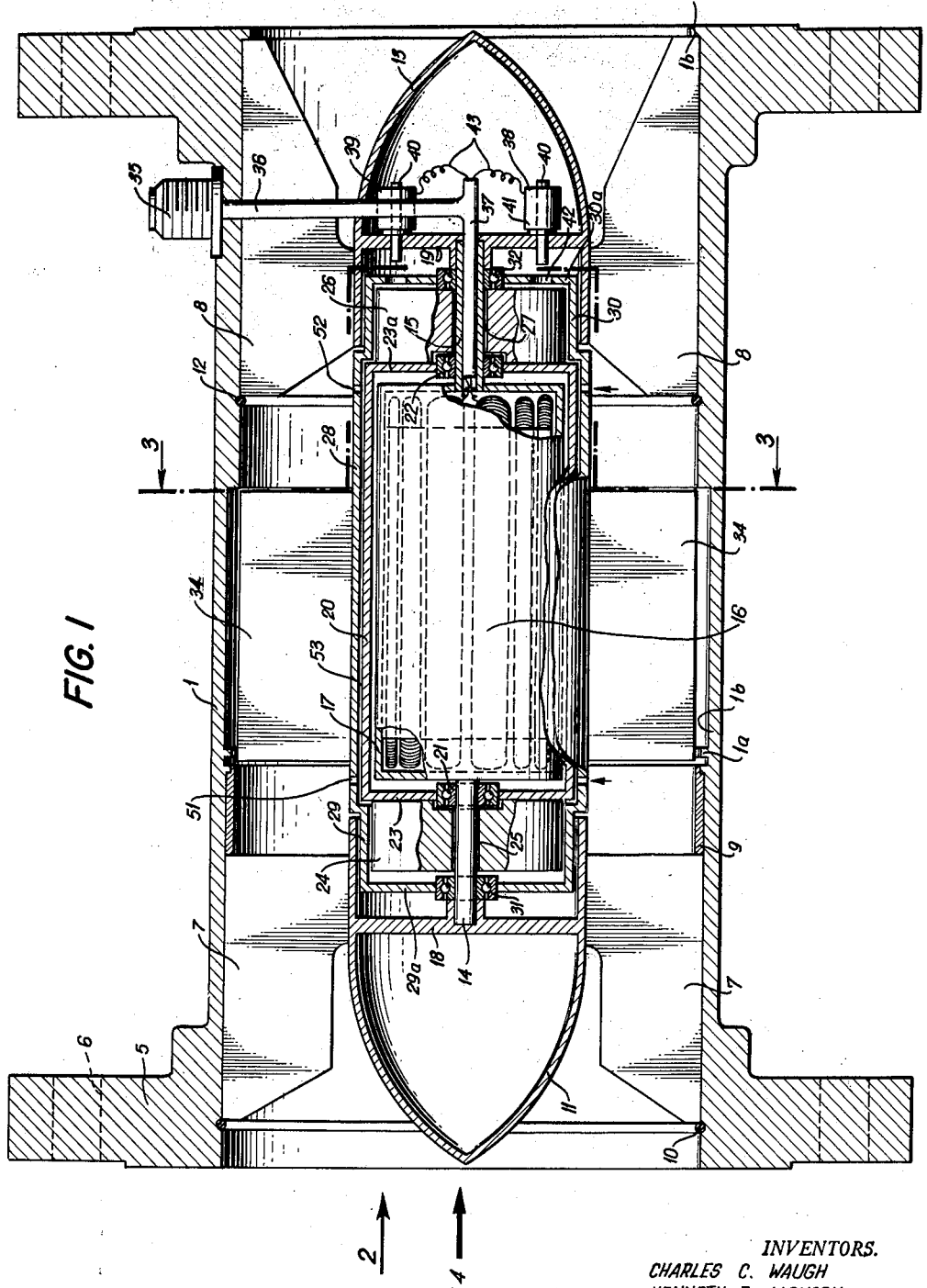
FIGURE 1 is a longitudinally sectional view of a mass flowmeter embodying the present invention and showing the single turbine rotor.

Referring to FIGURE 1, the outer case 1 of the flowmeter comprises a cylinder of stainless steel or other suitable material and may be equipped with flanged ends 5. The flanges are provided with mounting holes 6, as shown also in FIGURE 2, which permit the flowmeter to be coupled into a flow circuit designated by the arrow 4. The flow of the fluid through the device may be directed in either direction. Straightening vanes 7 and 8 at opposite ends of the casing eliminate any swirl or rotating component of motion in the entering and leaving fluid. The straightening vanes 7 are held in place at one end by collar 9 and at the other end by snap-ring 10 and these vanes support a bullet-shaped member 11 which is centered in the case. The collar 9 abuts a raised portion 1a on the interior surface of the case which serves as a stop for collar 9. The straightening vanes 8 are held against the raised portion 1b of the case by snap-ring 12 and a bullet-shaped member 13 is centrally supported in the case by vanes 8.

The bullet-shaped members 11 and 13 support stationary shafts 14 and 15, respectively, which hold a stationary motor armature 16 in a fixed position. The motor armature is surrounded by a stationary sealed casing 17 which protects the armature from contact with the fluid flowing in case 1. One end of stationary shaft 14 is rigidly secured to partition 18 in bullet-shaped member 11 and the other end is rigidly secured to one end of casing 17. In a like manner, one end of shaft 15 is secured to partition 19 in member 13 and the other end is secured to the opposite end of casing 17. A motor casing 20 surrounds stationary casing 17 and is rotatably supported at its ends on shafts 14 and 15 by bearings 21 and 22, respectively. The end 23 of casing 20 has secured thereto a permanent magnet disc 24 such as by welding or other suitable attachments. The permanent magnetic disc 24 contains a central opening 25 through which passes the shaft 14. In a similar manner the end 23a of the casing 20 supports a permanent magnetic disc 26 which has a central opening 27 through which passes the shaft 15. Both the magnets 24 and 26 are constructed of Alnico V (or comparable material). The magnetic turbine rotor 28 is in the form of a cylindrical casing which surrounds the casing 20 and the disc magnets 24 and 26. The main section of rotor 28 is of the same diameter as the maximum diameter of member 11 and the ends 29 and 30 are offset for insertion into the ends of the members 11 and 13 respectively in order to cover the permanent magnet discs 24 and 26. The end 29 rotates and is supported on shaft 14 by a bearing 31. The end 30 is rotatably supported on a shaft 15 by a bearing 32, so that the entire rotor 28 is free to rotate about the axis of the shafts 14 and 15. It is apparent that the offset ends 29 and 30 are in drag relationship with the disc magnets 24 and 26 respectively, so that rotation of the casing 20 by rotating field of the motor armature 16 will apply to the rotor casing 28 a rotating torque. The turbine rotor 28 carries a plurality of straight vanes 34 which extend between the rotor 28 and casing 1. When fluid is flowing through the casing 1, the rotation of the straight vanes 34 will impart an angular motion to the fluid. The end portions 29a and 30a of the turbine rotor 28, which are adjacent to the faces of the permanent magnetic discs 24 and 26, are fabricated of Vicalloy or similar magnetic material in order to achieve the desired hysteresis drive effect. Other portions of the turbine rotor, except for ends 29a and 30a, may be of stainless steel or other relatively non-magnetic material. By utilizing the stated materials for the permanent magnetic discs and for the ends 29a and 30a of the turbine rotor 28, a constant torque will be applied by the permanent magnets to the turbine rotor 28 independently of the speed at which the casing 20 is driven.

Since the armature casing 17 is fluid tight, the windings of the armature 16 are fully sealed from contact with the fluid flowing through the casing 1. The electrical connection to the armature windings is made through a connector 35, having a conduit 36 extending through the flow passage into the bullet-shaped member 13, and an extension 37 extending through a central opening in shaft 15 to the windings of the armature 16. When the motor armature 16 is energized, it rotates casing 20 to thereby rotate the armature discs 24 and 26. The rotation of the disc magnets impart a constant torque drive upon the rotor 28 in order to rotate the vanes 34 through the fluid passing through casing 1 and thereby impart an angular motion to the fluid. Since the torque imparted to the fluid by the vanes is substantially constant, the speed of the rotor 28 will be inversely proportional to the mass rate of flow of the fluid through the casing 1.

In order to sense the speed of the rotor 28 a pair of pick-offs 38 and 39 are supported on partition 19 of bullet-shaped member 13 at equal distances from shaft 15. Each of the pick-offs comprises permanent magnetic core 40 supported by a pick-up coil 41. These cores extend through partition 19 to a location opposite the end face 30a of the rotor. The end face 30a contains eight holes 42 which are rotated opposite the ends of the cores 40 and are radially spaced equal distances around end face 30a. Since the end 30a is fabricated of a magnetic material, the rotation of the holes 42 past the cores 40 will interrupt the magnetic circuit which will result in voltage pulses being generated in leads 43 of coils 41. The leads 43 of both coils pass through the conduit 36 to the connector 35 and the output from each pick-up coil will have a frequency proportional to the speed of the rotor 28. The illustrated device provides eight such voltage pulses during each revolution of rotor 28. Obviously fewer or more pulses can be provided by decreasing or increasing the number of holes 42.

Referring to FIGURE 4 the leads 43 of the pick-up 39 are connected by line 44 to a frequency-to-voltage converter 45 which produces a D.C. voltage proportional to frequency. This D.C. voltage lead is fed via line 46 to a servo indicator 47 which provides a reading of turbine rotor speed. The indicator 47 may be any of the well-known rebalancing type of servo-operated potentiometers. The input D.C. voltage level would be inversely proportional to the fluid flow; however, it is preferable that the indication on the servo indicator 47 be modified in any suitable manner, either through a change in reference scale or circuitry to read directly the reciprocal of turbine rotor 28 speed, so that the reading on the indicator 47 will be directly proportional to mass flow.

The leads 43 of the other pick-up 38 are connected via line 48 to a two-phase amplifier 50. The amplifier may be of the balanced type. The amplified signal is converted to a two-phase signal by means of suitable logical circuitry and is amplified to a level sufficient to power motor armature 16. The two-phase amplifier 50 is connected with any suitable source of A.C. power and has a minimum output independently of any signal received from the pick-up 38. The input signal from the pick-up 38 serves to increase the signal output of the amplifier in proportion with the frequency of the signal input and the increase in signal output additive to the minimum output always present from the amplifier. Thus, the minimum output signal is available to start to drive the motor armature 16 and commence rotation of the rotor 28 and thereafter the speed of rotation of the casing 20 driven by the armature will be proportional to the frequency of the input signal and to the frequency of the output signal from the amplifier 50. It is understood that once the rotation of the rotor 28 commences, the drive from the motor comprises a closed-loop servo system including the pick-up 38, amplifier 50, motor 16 and rotor 28.

The casing 1 has a cylindrical cut-out 1b opposite the ends of the rotor vanes 34 so that the rotor vanes can extend to be in line with the inner surface of the casing at opposite ends of the vanes. It is apparent that there will be a viscous drag resulting from the fluid located between the ends of the vanes and the cut-out 1b which will place an unwanted drag upon the rotor 28 tending to slow down the rotor. In order to compensate for this unwanted viscous drag, the rotor 28 contains a plurality of openings 51 spaced around the rotor adjacent one edge of the blades and a plurality of openings 52 spaced around the rotor at the opposite edge of the blades. The openings 51 and 52 permit the fluid within the casing to flow through space 53 between the motor casing 20 and the rotor 28 and, of course, this fluid can also surround the permanent magnet discs 24 and 26. If the fluid is flowing in the direction of arrow 4, the pressure at opening 51 will be higher than at the opening 52 downstream of the vanes 34 so that a flow will continuously result through space 53 of the same fluid to which angular momentum is being imparted by the turbine. The fluid located within the space 53 and around the permanent magnet discs will, of course, increase the torque coupling between the rotating motor casing 20 and the rotor 28 in order to compensate for the drag existing because of viscous drag at the outer edges of the rotor vanes. The viscous drag at the outer edges of the vanes will be substantially proportional to rotor speed and the increased viscous coupling between the motor casing 20 and the rotor 28 will be substantially proportional to the differential in speeds of the two members, the motor casing 20 having the higher speed. Thus, it is desirable to drive the motor casing 20 at some speed which will be a fixed ratio of the speed of the rotor 28 so that at higher rotor speeds, a larger speed differential will be available to produce an increase coupling to counteract the increased viscous drag at the outer edges of the vanes. In order to maintain a fixed ratio between the speeds of motor casing 20 and rotor 28, the amplifier 50 produces a signal output which will drive the motor 16 at some fixed ratio of the speed of the rotor sensed by pick-up 38. By utilizing the openings 51 and 52 the viscous compensation can be accomplished independently of the direction of flow of fluid through the meter and permits rapid change in the fluid within the space 53 when the character of the fluid introduced to the meter is changed.

A brief summary of the operation of the flow meter of the present invention will now be given:

The meter can be coupled to a liquid line by means of the flanges so that fluid can be introduced to the meter in the direction of arrow 4. When power is supplied to the amplifier 50, from any suitable A.C. source, the motor armature 16 will drive the motor casing 20 in order to impart an initial torque upon the rotor 28 through the permanent magnet discs 24, 26. Since the magnetic coupling has the characteristic of imparting constant torque regardless of the speed of the rotation of the motor casing, the vanes 34 will assume a speed which is inversely proportional to the mass flow rate to the casing 1. As the vanes 34 speed up the pick-up 38 will sense this increasing speed and will control the amplifier 50 to produce a signal output which will increase the speed of the casing 20 to a fixed selected ratio of the rotor speed. At the same time, the pick-up 39 will drive the servo indicator 47 to provide a measure of mass flow. Should thereafter the mass flow increase, the speed of the rotor 28 will decrease and this decrease in speed will be sensed by pick-ups 38 and 39. The decreased frequency of the signal in pick-up 38 will cause the amplifier 50 to drive the motor casing 20 at a reduced speed still at a fixed ratio to the new rotor speed. In the event that the mass flow dcreases from a previously established value, the rotor 28 will speed up with the result that the pick-up 38 will signal for an increase of the speed of the motor casing 20. As previously stated, by maintaining a fixed ratio of speeds between the rotor 28 and the motor casing 20, the viscous coupling in the space 53 is maintained at a value which substantially counteracts the viscous drag against the outer vanes 34. Also, by utilizing the hysteresis coupling between the motor casing and the rotor, a constant angular torque can be applied to the vanes 34 which in turn impart this torque to the fluid flow through casing 1 and the speed of the rotor will thereafter be substantially inversely proportional to mass flow and by utilizing the compensation for viscous drag, a high degree of accuracy in the measurement of mass flow rate can be obtained. It is apparent that various types of pick-ups can be utilized to sense the speed of rotation of the rotor 28 and that various circuitry can be utilized to convert this frequency into a voltage which is proportional to rotor speed or to obtain the reciprocal of such a voltage. Examples of the alternative pick-offs would include a D.C. generator having an armature driven by the rotor, photoelectric pick-offs and the like. Also, the synchronous motor 16 could be supplied with a constant frequency source to drive the motor at a constant speed but such a constant speed drive would not provide accurate fluid compensation for the viscous drag at the tips of the blades. It is also contemplated that no viscous drag compensation whatsoever would be utilized in certain applications so that the motor 16 would then be operated at substantially constant speed and the openings 51 and 52 in the casing would be eliminated. Conversely, the viscous drag compensation means described and shown herein may be applied to various types of flow measuring devices employing turbines or angularly displaceable impellers. Various other modifications are contemplated by those skilled in the art without departing from the spirit and scope of the invention as hereinafter described by the appended claims.

What is claimed is:

1. An apparatus for measuring the mass rate of fluid flow through a passage comprising turbine rotor means coaxially located within said passage, a plurality of vanes secured to said rotor means and extending longitudinally of said passage, means for imparting to said rotor means and said vanes a substantially constant rotational torque causing rotation of said vanes and thereby imparting to the fluid flowing past said vanes a substantially constant torque, and means for measuring the speed of rotation of said rotor means to obtain a quantity which is inversely proportional to fluid mass flow rate in said passage.

2. An apparatus as defined in claim 1 having means responsive to said quantity for obtaining the reciprocal of the speed of said rotor means to provide a direct measure of mass rate of fluid flow in said passage.

3. An apparatus as defined in claim 1 having means for placing a viscous drag upon said rotor means in a direction to oppose the viscous drag on said rotor and vanes resulting from rotation within the fluid in said passage.

4. An apparatus as defined in claim 1 wherein said torque imparting means comprises rotating permanent magnet means in hysteresis drag relationship with a portion of said rotor means, and motor means for rotating said magnet means.

5. An apparatus as defined in claim 4 wherein said rotor means comprises a hollow rotor, said permanent magnet means being located within said hollow rotor in drag relationship with a portion thereof.

6. An apparatus as defined in claim 5 wherein said motor means comprises a motor casing rotatably mounted within said hollow rotor and a stationary motor armature winding located within said motor casing for rotating said casing, said permanent magnet means being carried by said casing.

7. An apparatus as defined in claim 6 having conduit openings in said rotor for introducing fluid from said passage into the space between said rotor and said motor casing, said introduced fluid placing a compensating viscous drag on said rotor in a direction oppostie the viscous drag on said rotor and vanes produced by the fluid in said passage during rotation of said casing at a higher speed than that of said rotor.

8. An apparatus as defined in claim 7 having pick-up means for producing a signal proportional to the rate of rotation of said rotor, and means responsive to said signal and connected with said winding for controlling the speed of said motor casing so that the motor casing speed always exceeds the speed of said rotor in order to produce said compensating drag on said rotor.

9. An apparatus as defined in claim 8 wherein said controlling means produces a motor casing speed proportional to the speed of said rotor.

10. An apparatus as defined in claim 7 wherein said conduit openings are located in said rotor at two axial locations, one downstream of the other, to cause fluid to flow from the passage through said space and back into said passage.

References Cited in the file of this patent
UNITED STATES PATENTS

| | | |
|---|---|---|
| 2,857,761 | Bodge | Oct. 28, 1958 |
| 2,901,173 | Clicques | Aug. 25, 1959 |

FOREIGN PATENTS

| | | |
|---|---|---|
| 795,586 | Great Britain | May 28, 1958 |